(12) United States Patent
Zhao

(10) Patent No.: US 10,082,688 B2
(45) Date of Patent: Sep. 25, 2018

(54) OPTICAL ALIGNMENT DEVICE FOR LIQUID CRYSTAL DISPLAY PANELS

(71) Applicant: Shenzhen China Star Optoelectronics Technology Co., Ltd., Shenzhen (CN)

(72) Inventor: Rentang Zhao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 55 days.

(21) Appl. No.: 15/310,102

(22) PCT Filed: Jun. 28, 2016

(86) PCT No.: PCT/CN2016/087382
§ 371 (c)(1),
(2) Date: Nov. 10, 2016

(87) PCT Pub. No.: WO2017/181525
PCT Pub. Date: Oct. 26, 2017

(65) Prior Publication Data
US 2017/0307913 A1    Oct. 26, 2017

(30) Foreign Application Priority Data
Apr. 21, 2016 (CN) .......................... 2016 1 0255155

(51) Int. Cl.
*G02F 1/1337* (2006.01)
*G02F 1/13* (2006.01)

(52) U.S. Cl.
CPC ...... *G02F 1/1303* (2013.01); *G02F 1/133788* (2013.01)

(58) Field of Classification Search
CPC .................. G02F 1/133788; G02F 1/1303
See application file for complete search history.

(56) References Cited

U.S. PATENT DOCUMENTS

| | | | |
|---|---|---|---|
| 2005/0142465 A1 | 6/2005 | Park et al. | |
| 2009/0195746 A1 | 8/2009 | Chu | |
| 2014/0227929 A1* | 8/2014 | Miyachi | G02F 1/133788 445/24 |
| 2015/0124236 A1* | 5/2015 | Lin | G03F 7/0005 355/77 |

FOREIGN PATENT DOCUMENTS

| | | |
|---|---|---|
| CN | 1637486 | 7/2005 |
| CN | 101498866 | 8/2009 |
| CN | 104635382 | 5/2015 |
| CN | 104932147 | 9/2015 |
| CN | 104965388 | 10/2015 |

* cited by examiner

Primary Examiner — John A McPherson

(57) ABSTRACT

An optical alignment device for a plurality of liquid crystal display panels is disclosed, and has a panel carrying stage, a UV lamp, and a plurality of irradiation masks. The panel carrying stage is used for placing the liquid crystal display panels, the UV lamp is used for applying a UV irradiation to the liquid crystal display panels on the panel carrying stage so that liquid crystals in each of the liquid crystal display panels have pretilt angles, and the irradiation masks are disposed between the UV lamp and the liquid crystal display panels for changing an irradiation intensity of the UV irradiation on the crystal display panels.

14 Claims, 5 Drawing Sheets

OPTICAL ALIGNMENT DEVICE FOR LIQUID CRYSTAL DISPLAY PANELS

RELATED APPLICATIONS

This application is a National Phase of PCT Patent Application No. PCT/CN2016/087382 having International filing date of Jun. 28, 2016, which claims the benefit of priority of Chinese Patent Application No. 201610255155.9 filed on Apr. 21, 2016. The contents of the above applications are all incorporated by reference as if fully set forth herein in their entirety.

FIELD AND BACKGROUND OF THE INVENTION

The present invention relates to a liquid crystal display technology, and more particularly to an optical alignment device for a plurality of liquid crystal display panels.

PSVA (polymer stabilized vertical alignment) is a technology for producing a TFT-LCD (thin film transistor-liquid crystal display). Liquid crystals in the liquid crystal display panels comprise reactive monomers which can be activated by UV irradiation, so as to form a pretilt angle of the liquid crystals. The abovementioned process is called UV optical alignment.

In the UV optical alignment, the pretilt angle of the liquid crystals directly influences optical properties of the panel. When the pretilt angle is too small, the response time is too slow; when the pretilt angle is too large, the contrast of the panel is too low. The influence factors of the pretilt angle comprise UV intensity, UV irradiation time, the total amount of the UV irradiation, and temperature.

Currently, the liquid crystal display panel is produced by a process for a large size panel. That is, a piece of large size panel can be divided into a plurality of panels. The panels should generally be the same size for integrating the design and manufacturing flow. According to the abovementioned principle, it is possible to leave a lot of area on the substrate after the arrangement of certain size panels is finished, and thus the substrate utilization is lower. Therefore, an MMG (multimodel glass) product is developed. On the MMG substrate, the panels having different sizes can be arranged so that the area remaining on the substrate can be decreased to improve the substrate utilization.

However, the UV irradiation on the MMG substrate always has a uniform intensity, but the aperture ratios or the transmittances of the panels having different sizes are possibly different from each other, which may cause various dimensional panels to receive different UV intensities and form the different pretilt angles, so that pretilt angles of the liquid crystals in a portion of the panels cannot reach to standard.

It is therefore necessary to provide an optical alignment device for a plurality of liquid crystal display panels to solve the problems existing in the conventional technology as described above.

SUMMARY OF THE INVENTION

In view of abovementioned problems, the present invention provides an optical alignment device for a plurality of liquid crystal display panels, having a higher compliance rate of an optical alignment, in order to solve the lower compliance rate of the current optical alignment box for the liquid crystal display panels.

One embodiment of the present invention provides an optical alignment device for a plurality of liquid crystal display panels, comprising:

a panel carrying stage for placing the liquid crystal display panels;

a UV lamp for applying a UV irradiation to the liquid crystal display panels on the panel carrying stage so that liquid crystals in each of the liquid crystal display panels have pretilt angles; and a plurality of irradiation masks disposed between the UV lamp and the liquid crystal display panels for changing an irradiation intensity of the UV irradiation on the crystal display panels;

wherein each of the irradiation masks has a transmittance correspondingly determined by parameters of the pretilt angles of at least one of the liquid crystal display panels.

In the optical alignment device for the liquid crystal display panels of the present invention, the liquid crystal display panels with different sizes have the parameters of the pretilt angles different from each other.

In the optical alignment device for the liquid crystal display panels of the present invention, the liquid crystal display panels with the same size have the parameters of the pretilt angles identical to each other.

In the optical alignment device for the liquid crystal display panels of the present invention, the parameters of the pretilt angles of the liquid crystal display panels are aperture ratios.

In the optical alignment device for the liquid crystal display panels of the present invention, the transmittances of all of the irradiation masks are correspondingly determined by the parameters of the pretilt angles of the liquid crystal display panels, so as to allow the liquid crystals of all of the liquid crystal display panels having the pretilt angles substantially identical to each other.

One embodiment of the present invention further provides an optical alignment device for a plurality of liquid crystal display panels, comprising:

a panel carrying stage for placing the liquid crystal display panels; and a plurality of UV lamps for applying UV irradiations to the liquid crystal display panels on the panel carrying stage so that liquid crystals in the liquid crystal display panels have pretilt angles;

wherein each of the UV lamps has an irradiation power correspondingly determined by parameters of pretilt angles of at least one of the liquid crystal display panels.

In the optical alignment device for the liquid crystal display panels of the present invention, the liquid crystal display panels with different sizes have the parameters of the pretilt angles different from each other.

In the optical alignment device for the liquid crystal display panels of the present invention, the liquid crystal display panels with the same size have the parameters of the pretilt angles identical to each other.

In the optical alignment device for the liquid crystal display panels of the present invention, the parameters of the pretilt angles of the liquid crystal display panels are aperture ratios.

In the optical alignment device for the liquid crystal display panels of the present invention, the irradiation powers of all of the UV lamps are correspondingly determined by the parameters of the pretilt angles of the liquid crystal display panels, so as to allow the liquid crystals of all of the liquid crystal display panels having the pretilt angles substantially identical to each other.

One embodiment of the present invention further provides an optical alignment device for a plurality of liquid crystal display panels, comprising:

a panel carrying stage for placing the liquid crystal display panels, a UV lamp for applying a UV irradiation to the liquid crystal display panels on the panel carrying stage so that liquid crystals in the liquid crystal display panels have pretilt angles; and a plurality of blocking plates disposed between the UV lamp and the liquid crystal display panels for shading the liquid crystal display panels from the UV irradiation thereon;

wherein time periods for shading each of the liquid crystal display panels from the UV irradiation are correspondingly determined by parameters of pretilt angles of at least one of the liquid crystal display panels.

In the optical alignment device for the liquid crystal display panels of the present invention, the liquid crystal display panels with different sizes have the parameters of the pretilt angles different from each other.

In the optical alignment device for the liquid crystal display panels of the present invention, the liquid crystal display panels with the same size have the parameters of the pretilt angles identical to each other.

In the optical alignment device for the liquid crystal display panels of the present invention, the blocking plates corresponding to the liquid crystal display panels are removed according to the time periods from less to more during performing an optical alignment.

In the optical alignment device for the liquid crystal display panels of the present invention, the blocking plates corresponding to the liquid crystal display panels are removed according to the time periods from more to less during performing an optical alignment.

In the optical alignment device for the liquid crystal display panels of the present invention, the parameters of the pretilt angles of the liquid crystal display panels are aperture ratios.

In the optical alignment device for the liquid crystal display panels of the present invention, the time periods for shading all of the liquid crystal display panels from the UV irradiation are correspondingly determined by the parameters of the pretilt angles of the liquid crystal display panels, so as to allow the liquid crystals of all of the liquid crystal display panels having the pretilt angles substantially identical to each other.

In the optical alignment device for the liquid crystal display panels of the present invention, the transmittances of all of the irradiation masks, the irradiation powers of all of the UV lamps, and the time periods for shading all of the liquid crystal display panels from the UV irradiation are correspondingly determined by the parameters of the pretilt angles of the liquid crystal display panels, so that the compliance rate of the optical alignment can be raised, and the lower compliance rate resulting from the current optical alignment device for the liquid crystal display panels can be solved.

BRIEF DESCRIPTION OF THE SEVERAL VIEWS OF THE BDRAWINGS

The detailed description of the following embodiments is used for exemplifying the specific embodiments of the present invention by referring to the accompany drawings. Furthermore, directional terms described by the present invention, such as upper, lower, front, back, left, right, inner, outer, side, etc., are only directions by referring to the accompanying drawings, and thus the directional terms are used to describe and understand the present invention, but the present invention is not limited thereto.

DESCRIPTION OF SPECIFIC THE PREFERRED EMBODIMENTS OF THE INVENTION

Figure 1A:
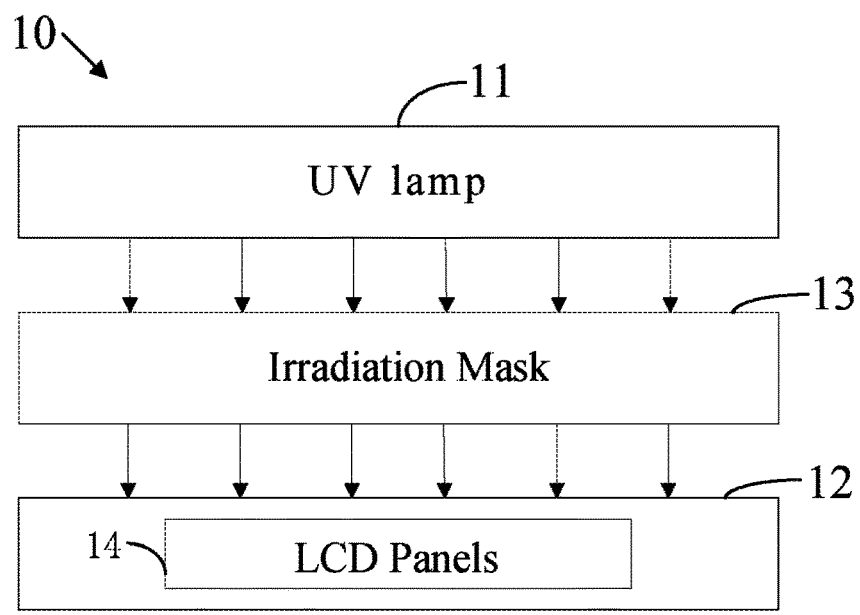
FIG. 1A is a schematic structure of an optical alignment device for a plurality of liquid crystal display panels according to the first embodiment of the present invention.

Please refer to the drawings, like reference numerals designate like elements throughout the specification. The principle of the present invention is described by the embodiments in suitable operation conditions. The drawings and description are to be regarded as illustrative in nature and not restrictive.

Figure 1B:
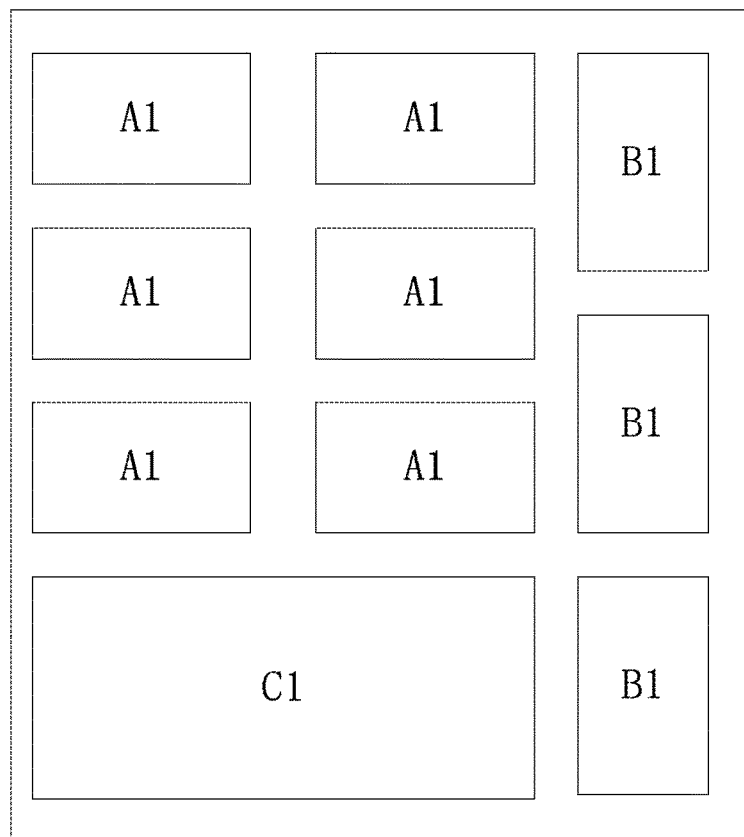
FIG. 1B is a schematic arrangement of the liquid crystal display panels on a panel carrying stage of the optical alignment device for the liquid crystal display panels according to the first embodiment of the present invention.
Figure 1C:
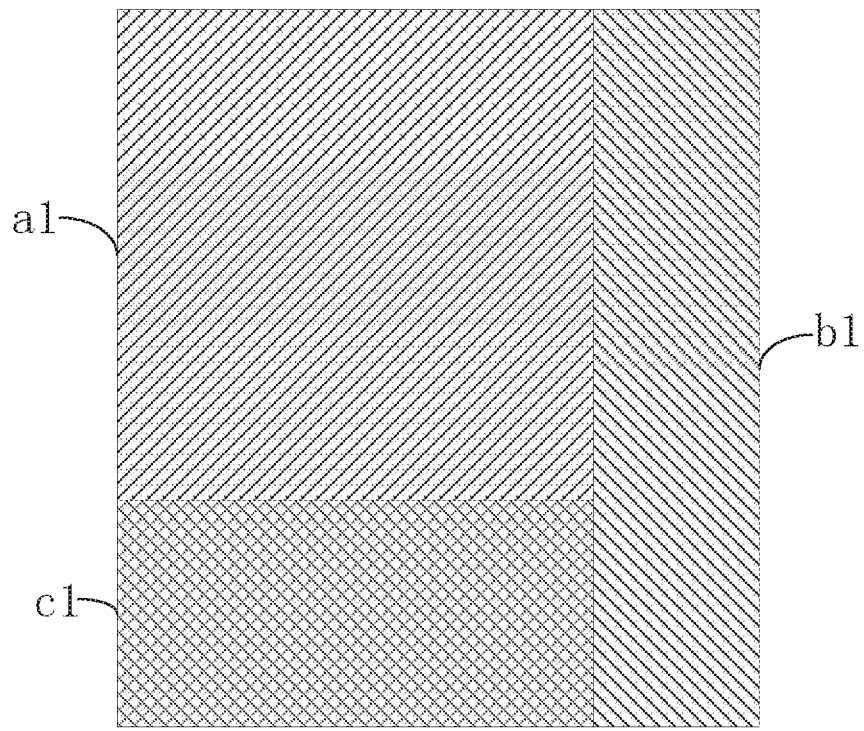
FIG. 1C is a schematic arrangement of a plurality of irradiation masks of the optical alignment device for the liquid crystal display panels according to the first embodiment of the present invention.

Referring to FIGS. 1A to 1C, FIG. 1A is a schematic structure of an optical alignment device for a plurality of liquid crystal display panels according to the first embodiment; FIG. 1B is a schematic arrangement of the liquid crystal panels placed on a panel carrying stage of the optical alignment device for the liquid crystal display panels according to the first embodiment; FIG. 1C is a schematic arrangement of a plurality of irradiation masks of the optical alignment device for the liquid crystal display panels according to the first embodiment of the present invention. The optical alignment device 10 of this embodiment comprises a panel carrying stage 11, a UV lamp 12, and a plurality of irradiation masks 13.

The panel carrying stage 11 is used for placing the liquid crystal display panels 14; the UV lamp 12 is used for applying a UV irradiation to the liquid crystal display panels 14 on the panel carrying stage 11 so that liquid crystals in each of the liquid crystal display panels 14 have pretilt angles; the irradiation masks 13 are disposed between the UV lamp 12 and the liquid crystal display panels 14 for changing an irradiation intensity of the UV irradiation on the crystal display panels 14. Each of the irradiation masks 13 has a transmittance correspondingly determined by at least one of parameters of the pretilt angles of at least one of the liquid crystal display panels 14 so as to allow the liquid crystals in the liquid crystal display panels 14 receiving the total amount of the UV irradiation substantially identical within an area unit, and thus the liquid crystals in each of the liquid crystal display panels 14 can form pretilt angles substantially identical to each other. The parameters of the pretilt angles of the liquid crystal display panels are the parameters such as aperture ratios which determine irradiation intensities of the UV irradiation on the panels.

The liquid crystal display panels 14 with different sizes have the parameters of the pretilt angles different from each other. The liquid crystal display panels 14 with the same size have the parameters of the pretilt angles identical to each other.

Referring to FIG. 1B, the panel carrying stage 11 of the optical alignment device 10 has three types of liquid crystal display panels 14 disposed thereon, i.e. panel A1, panel B1, and panel C1. For example, the aperture ratio of the panel A1 is greater than the aperture ratio of the panel B1, and the aperture ratio of the panel B1 is greater than the aperture ratio of the panel C1. Accordingly, the transmittance of the irradiation mask a1 corresponding to the panel A1 can be determined to be less than the transmittance of the irradiation mask b1 corresponding to the panel B1; the transmittance of the irradiation mask b1 corresponding to the panel B1 can be determined to be less than the transmittance of the irradiation mask c1 corresponding to the panel C1 as shown in FIG. 1C, specifically.

Therefore, when the optical alignment device 10 performs an optical alignment operation on the liquid crystal display panels 14, the UV lamp 12 emits the UV irradiation passed through the irradiation mask a1, irradiation mask b1, and the irradiation masks c1, and then the UV irradiation having different irradiation intensities on the liquid crystal display panels 14. Because the panel A1, the panel B1, and the panel C1 have different parameters of the pretilt angles, the liquid crystal display panels 14 have different abilities to hinder the UV irradiation. Through the irradiation masks 1 having different transmittances and the liquid crystal display panels 14 having different parameters of the pretilt angles, the irradiation intensities received by the liquid crystals in each of the liquid crystal display panels 14 can be adjusted to be identical, so that each of the liquid crystal display panels 14 has the same pretilt angle to satisfy the requirement of the pretilt angle in every panel. The compliance rate of the optical alignment in the liquid crystal panels 14 can be raised.

In the optical alignment device for the liquid crystal display panels according to the present invention, the transmittance of each of the irradiation masks is determined by at least one of the parameters of the pretilt angles of the liquid crystal display panels, so that the compliance rate of the optical alignment in the liquid crystal panels 14 can be raised.

Figure 2A:
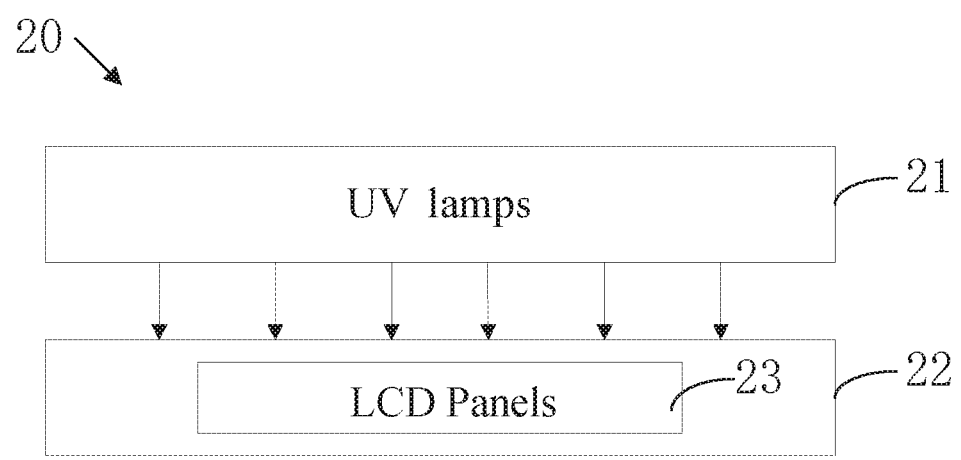
FIG. 2A is a schematic structure of an optical alignment device for a plurality of liquid crystal display panels according to the second embodiment of the present invention.
Figure 2B:
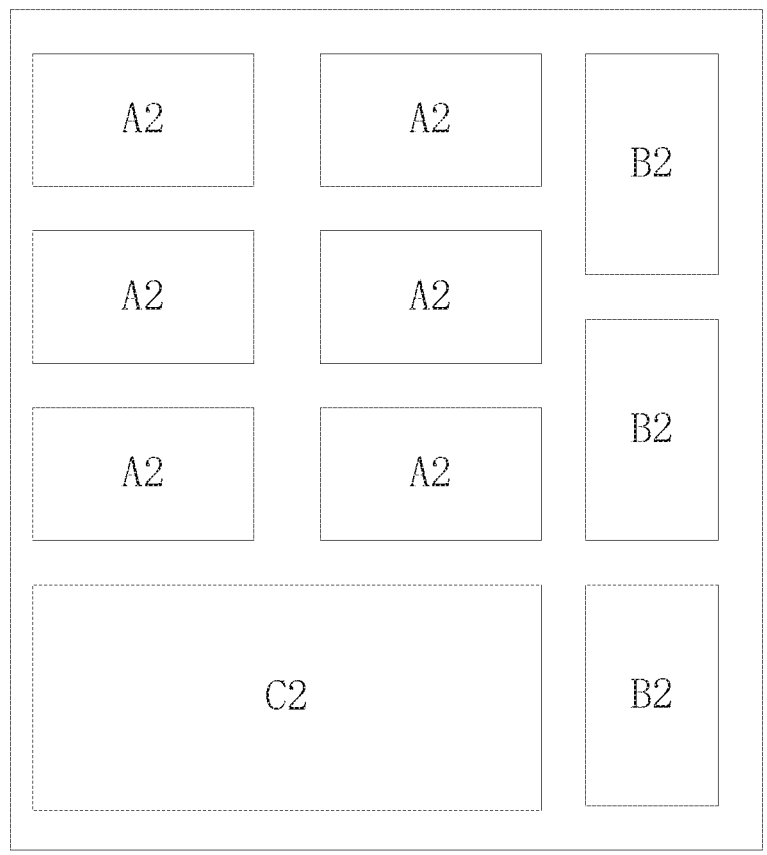
FIG. 2B is a schematic arrangement of the liquid crystal display panels on a panel carrying stage of the optical alignment device for the liquid crystal display panels according to the second embodiment of the present invention.
Figure 2C:
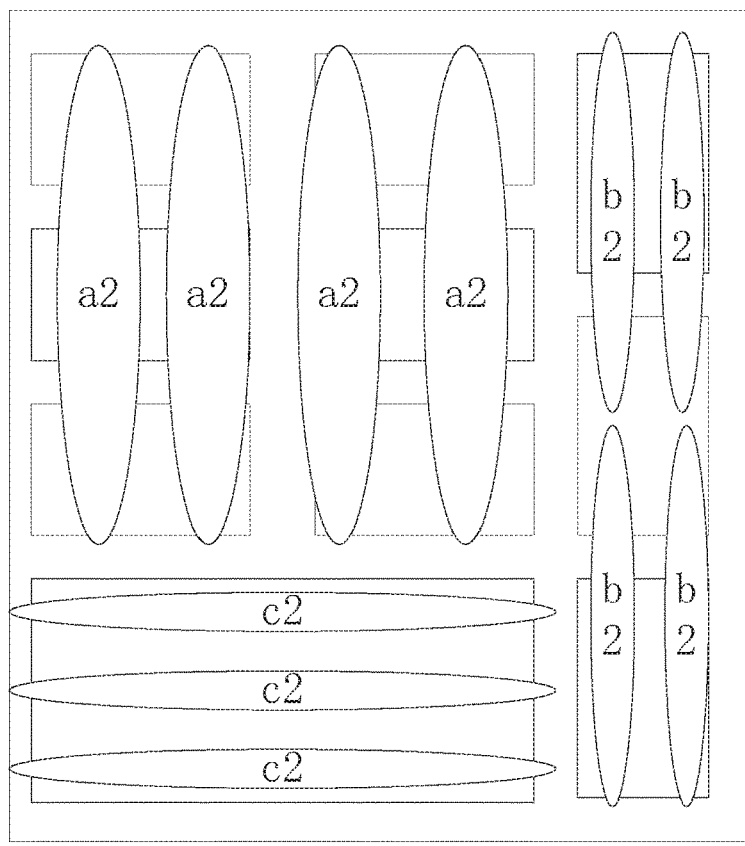
FIG. 2C is a schematic arrangement of a UV lamp of the optical alignment device for the liquid crystal display panels according to the second embodiment of the present invention.

Referring to FIGS. 2A to 2C, FIG. 2A is a schematic structure of an optical alignment device for a plurality of liquid crystal display panels according to the second embodiment of the present invention; FIG. 2B is a schematic arrangement of the liquid crystal display panels on a panel carrying stage of the optical alignment device for the liquid crystal display panels according to the second embodiment of the present invention; FIG. 2C is a schematic arrangement of a UV lamp of the optical alignment device for the liquid crystal display panels according to the second embodiment of the present invention. The optical alignment device 20 of this embodiment comprises a panel carrying stage 21 and a plurality of UV lamps 22.

The panel carrying stage 21 is used for placing the liquid crystal display panels 23; The UV lamps 22 are used for applying a UV irradiation to the liquid crystal display panels 23 on the panel carrying stage 21 so that liquid crystals in each of the liquid crystal display panels 23 have pretilt angles. Each of the UV lamps 22 has an irradiation power correspondingly determined by at least one parameter of pretilt angles of at least one of the liquid crystal display panels 23 so as to allow the liquid crystals in the liquid crystal display panels 23 receiving the total amount of the UV irradiation substantially identical within an area unit, and thus the liquid crystals in each of the liquid crystal display panels 23 can form pretilt angles substantially identical to each other. The parameters of the pretilt angles of the liquid crystal display panels 23 are the parameters such as aperture ratios which determine irradiation intensities of the UV irradiation on the panels.

The liquid crystal display panels 23 with different sizes have the parameters of the pretilt angles different from each other. The liquid crystal display panels 23 with the same size have the parameters of the pretilt angles identical to each other.

Referring to FIG. 2B, the panel carrying stage 21 of the optical alignment device 20 has three types of liquid crystal display panels disposed thereon, i.e. panel A2, panel B2, and panel C2. For example, the aperture ratio of the panel A2 is greater than the aperture ratio of the panel B1, and the aperture ratio of the panel B1 is greater than the aperture ratio of the panel C1. Accordingly, the irradiation power of the UV lamp a2 corresponding to the panel A2 can be determined to be less than irradiation power of the UV lamp b2 corresponding to the panel B2; irradiation power of the UV lamp b2 corresponding to the panel B2 can be determined to be less than irradiation power of the UV lamp c2 corresponding to the panel C2 as shown in FIG. 2C, specifically.

Therefore, when the optical alignment device 20 performs an optical alignment operation on the liquid crystal display panels 23, the UV lamp a2, the UV lamp b2, and the UV lamp c2 emit UV irradiations having different irradiation intensities on the liquid crystal display panels 23. Because the panel A2, the panel B2, and the panel C2 have different parameters of the pretilt angles, the liquid crystal display panels 23 have different abilities to hinder the UV irradiations. Through the UV lamps 22 having different irradiation powers and the liquid crystal display panels 23 having different parameters of the pretilt angles, the irradiation intensities received by the liquid crystals in each of the liquid crystal display panels 23 can be adjusted to be identical, so that each of the liquid crystal display panels 23 has the same pretilt angle to satisfy the requirement of the pretilt angle in every panel. The compliance rate of the optical alignment in the liquid crystal panels 14 can be raised.

In the optical alignment device for the liquid crystal display panels according to the present invention, the irradiation power of each of the UV lamps is determined by at least one parameter of the pretilt angles of the liquid crystal display panels, so that the compliance rate of the optical alignment in the liquid crystal panels can be raised.

Figure 3A:
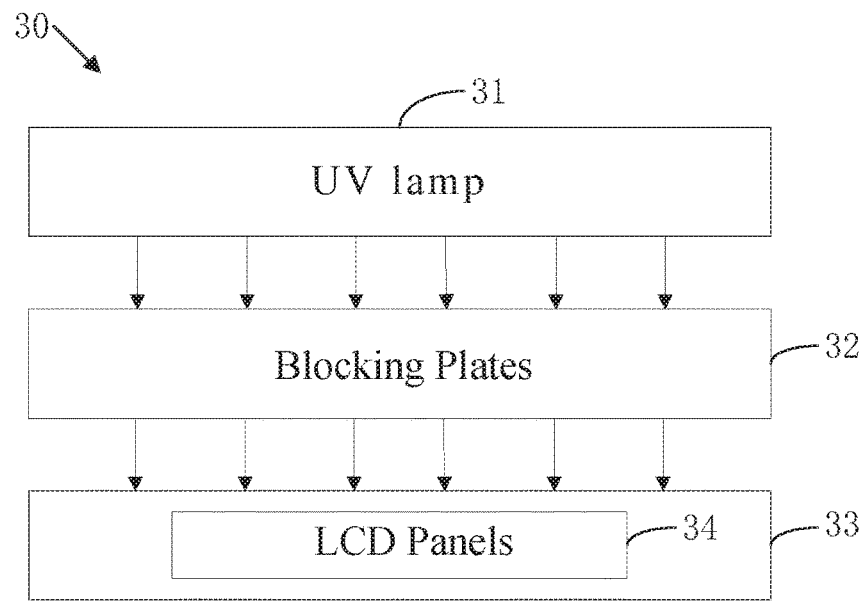
FIG. 3A is a schematic structure of an optical alignment device for a plurality of liquid crystal display panels according to the third embodiment of the present invention.
Figure 3B:
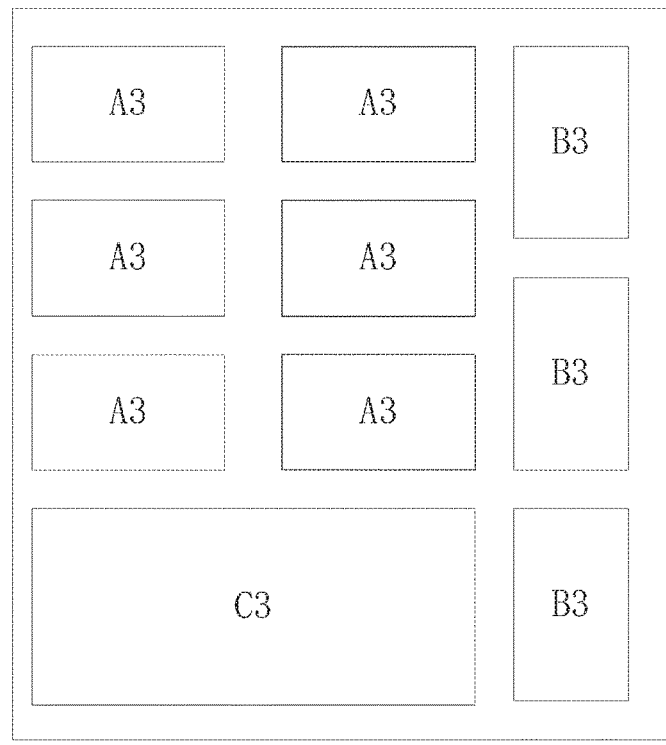
FIG. 3B is a schematic arrangement of the liquid crystal display panels on a panel carrying stage of the optical alignment device for the liquid crystal display panels according to the third embodiment of the present invention.
Figure 3C:
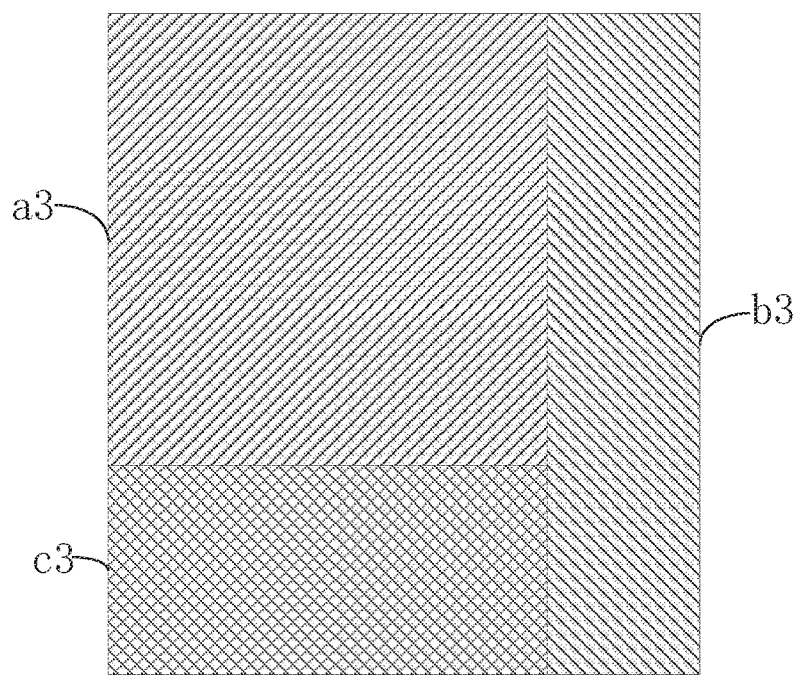
FIG. 3C is a schematic arrangement of a plurality of blocking plates of the optical alignment device for the liquid crystal display panels according to the third embodiment of the present invention.

Referring to FIGS. 3A to 3C, FIG. 3A is a schematic structure of an optical alignment device for a plurality of liquid crystal display panels according to the third embodiment of the present invention; FIG. 3B is a schematic arrangement of the liquid crystal display panels on a panel carrying stage of the optical alignment device for the liquid crystal display panels according to the third embodiment of the present invention; FIG. 3C is a schematic arrangement of blocking plates of the optical alignment device for the liquid crystal display panels according to the third embodiment of the present invention. The optical alignment device 30 of this embodiment comprises a panel carrying stage 31, a UV lamp 32, and a plurality of blocking plates 33.

The panel carrying stage 31 is used for placing the liquid crystal display panels 34; the UV lamp 32 is used for applying a UV irradiation to the liquid crystal display panels 34 on the panel carrying stage 31 so that liquid crystals in each of the liquid crystal display panels 34 have pretilt angles; the blocking plates 33 are disposed between the UV lamp 32 and the liquid crystal display panels 34 for shading the liquid crystal display panels 34 from the UV irradiation thereon. Each of the blocking plates 33 has a time period for shading each of the liquid crystal display panels 34 from the UV irradiation, the time period is correspondingly determined by at least one of parameters of pretilt angles of at least one of the liquid crystal display panels 34 so as to allow the liquid crystals in the liquid crystal display panels 34 receiving the total amount of the UV irradiation substantially identical within an area unit, and thus the liquid crystals in each of the liquid crystal display panels 34 can form the pretilt angles substantially identical to each other. The parameters of the pretilt angles of the liquid crystal display panels are the parameters such as aperture ratios which determine irradiation intensities of the UV irradiation on the panels.

The liquid crystal display panels 34 with different sizes have the parameters of the pretilt angles different from each other. The liquid crystal display panels 34 with the same size have the parameters of the pretilt angles identical to each other.

Referring to FIG. 3B, the panel carrying stage 31 of the optical alignment device 30 has three types of liquid crystal display panels disposed thereon, i.e. panel A3, panel B3, and panel C3. For example, the aperture ratio of the panel A3 is greater than the aperture ratio of the panel B3, and the aperture ratio of the panel B3 is greater than the aperture ratio of the panel C3. Accordingly, the time period of the blocking plate a3 corresponding to the panel A3 can be determined to be less than the time period of the blocking plate b3 corresponding to the panel B3; the time period of the blocking plate b3 corresponding to the panel B3 can be determined to be less than the time period of the blocking plate c3 corresponding to the panel C3 as shown in FIG. 3C, specifically.

Therefore, when the optical alignment device 30 performs an optical alignment operation on the liquid crystal display panels 34, the UV irradiation is simultaneously applied to the panel A3, the panel B3, and the panel C3. When the pretilt angle of the liquid crystals of the panel A3 reaches to a predetermined value, the blocking plate a3 shades the UV irradiation on the panel A3; next, when the pretilt angle of the liquid crystals of the panel B3 reaches to the predetermined value, the blocking plate b3 shades the UV irradiation on the panel B3; next, when the pretilt angle of the liquid crystals of the panel C3 reaches to the predetermined value, the blocking plate c3 shades the UV irradiation on the panel C3. Through the blocking plates 33 and the liquid crystal display panels 34 having different parameters of the pretilt angles, the irradiation intensities received by the liquid crystals in each of the liquid crystal display panels 34 can be adjusted to be identical, so that each of the liquid crystal display panels 34 has the same pretilt angle to satisfy the requirement of the pretilt angle in every panel. The compliance rate of the optical alignment in the liquid crystal panels 34 can be raised.

Alternatively, the UV irradiation can be applied to the panel C3 firstly, and simultaneously, the blocking plate a3 shades the UV irradiation on the panel A3 and the blocking plate b3 shades the UV irradiation on the panel B3. After irradiating for a first predetermined period (the first predetermined period is a different value between the time period of the blocking plate c3 and the time period of the blocking plate b3), the blocking plate b3 is removed. After a second predetermined period (the second predetermined period is a different value between the time period of the blocking plate c3 and the time period of the blocking plate a3), the blocking plate a3 is removed. Through the blocking plates 33 and the liquid crystal display panels 34 having different parameters of the pretilt angles, the irradiation intensities received by the liquid crystals in each of the liquid crystal display panels 34 can be adjusted to be identical, so that each of the liquid crystal display panels 34 has the same pretilt angle to satisfy the requirement of the pretilt angle in every panel. The compliance rate of the optical alignment in the liquid crystal panels 34 can be raised.

In the optical device for the liquid crystal display panels of the embodiment, the time periods for shading each of the liquid crystal display panels from the UV irradiation are correspondingly determined by the parameters of the pretilt angles of at least one of the liquid crystal display panels, so that the compliance rate of the optical alignment can be raised.

The optical alignment device for the liquid crystal display panels of the present invention, the transmittances of all of the irradiation masks, the irradiation powers of all of the UV lamps, and the time periods for shading all of the liquid crystal display panels from the UV irradiation are correspondingly determined by the parameters of the pretilt angles of the liquid crystal display panels, so that the compliance rate of the optical alignment can be raised, and the lower compliance rate resulted from the current optical alignment device for the liquid crystal display panels can be solved.

The present invention has been described with preferred embodiments thereof and it is understood that many changes and modifications to the described embodiments can be carried out without departing from the scope and the spirit of the invention that is intended to be limited only by the appended claims.

What is claimed is:

1. An optical alignment device for a plurality of liquid crystal display panels, comprising:
   a panel carrying stage for placing the liquid crystal display panels;
   a UV lamp for applying a UV irradiation to the liquid crystal display panels on the panel carrying stage so that liquid crystals in each of the liquid crystal display panels have pretilt angles; and
   a plurality of irradiation masks disposed between the UV lamp and the liquid crystal display panels for changing an irradiation intensity of the UV irradiation on the crystal display panels;
   wherein each of the irradiation masks has a transmittance correspondingly determined by parameters of the pretilt angles of at least one of the liquid crystal display panels, and the liquid crystal display panels with different sizes have the parameters of the pretilt angles different from each other.

2. The optical alignment device for the liquid crystal display panels according to claim 1, wherein the liquid crystal display panels with the same size have the parameters of the pretilt angles identical to each other.

3. The optical alignment device for the liquid crystal display panels according to claim 1, wherein the parameters of the pretilt angles of the liquid crystal display panels are aperture ratios.

4. The optical alignment device for the liquid crystal display panels according to claim 1, wherein the transmittances of all of the irradiation masks are correspondingly determined by the parameters of the pretilt angles of the liquid crystal display panels, so as to allow the liquid crystals of all of the liquid crystal display panels having the pretilt angles substantially identical to each other.

5. An optical alignment device for a plurality of liquid crystal display panels, comprising:
a panel carrying stage for placing the liquid crystal display panels; and
a plurality of UV lamps for applying UV irradiations to the liquid crystal display panels on the panel carrying stage so that liquid crystals in the liquid crystal display panels have pretilt angles;
wherein each of the UV lamps has an irradiation power correspondingly determined by parameters of pretilt angles of at least one of the liquid crystal display panels, and the liquid crystal display panels with different sizes have the parameters of the pretilt angles different from each other.

6. The optical alignment device for the liquid crystal display panels according to claim 5, wherein the liquid crystal display panels with the same size have the parameters of the pretilt angles identical to each other.

7. The optical alignment device for the liquid crystal display panels according to claim 5, wherein the parameters of the pretilt angles of the liquid crystal display panels are aperture ratios.

8. The optical alignment device for the liquid crystal display panels according to claim 5, wherein the irradiation powers of all of the UV lamps are correspondingly determined by the parameters of the pretilt angles of the liquid crystal display panels, so as to allow the liquid crystals of all of the liquid crystal display panels having the pretilt angles substantially identical to each other.

9. An optical alignment device for a plurality of liquid crystal display panels, comprising:
a panel carrying stage for placing the liquid crystal display panels;
a UV lamp for applying a UV irradiation to the liquid crystal display panels on the panel carrying stage so that liquid crystals in the liquid crystal display panels have pretilt angles; and
a plurality of blocking plates disposed between the UV lamp and the liquid crystal display panels for shading the liquid crystal display panels from the UV irradiation thereon;
wherein time periods for shading each of the liquid crystal display panels from the UV irradiation are correspondingly determined by parameters of pretilt angles of at least one of the liquid crystal display panels, and the liquid crystal display panels with different sizes have the parameters of the pretilt angles different from each other.

10. The optical alignment device for the liquid crystal display panels according to claim 9, wherein the liquid crystal display panels with the same size have the parameters of the pretilt angles identical to each other.

11. The optical alignment device for the liquid crystal display panels according to claim 9, wherein the parameters of the pretilt angles of the liquid crystal display panels are aperture ratios.

12. The optical alignment device for the liquid crystal display panels according to claim 9, wherein the time periods for shading all of the liquid crystal display panels from the UV irradiation are correspondingly determined by the parameters of the pretilt angles of the liquid crystal display panels, so as to allow the liquid crystals of all of the liquid crystal display panels having the pretilt angles substantially identical to each other.

13. The optical alignment device for the liquid crystal display panels according to claim 9, wherein the blocking plates corresponding to the liquid crystal display panels are removed according to the time periods from less to more during performing an optical alignment.

14. The optical alignment device for the liquid crystal display panels according to claim 9, wherein the blocking plates corresponding to the liquid crystal display panels are removed according to the time periods from more to less during performing an optical alignment.

* * * * *